(12) United States Patent
Shimizu

(10) Patent No.: US 6,168,383 B1
(45) Date of Patent: Jan. 2, 2001

(54) ROTOR BLADE FOR ROTARY-WING AIRCRAFT

(75) Inventor: Toshio Shimizu, Utsunomiya (JP)

(73) Assignee: Fuji Jukogyo Kabushiki Kaisha, Tokyo-To (JP)

(*) Notice: Under 35 U.S.C. 154(b), the term of this patent shall be extended for 0 days.

(21) Appl. No.: 09/067,916

(22) Filed: Apr. 29, 1998

(30) Foreign Application Priority Data

May 15, 1997 (JP) .................................................. 9-125442

(51) Int. Cl.$^7$ .............................. B64C 11/16; B64C 27/46
(52) U.S. Cl. ..................... 416/228; 416/223 R; 416/237; 416/231 B; 416/235; 415/119
(58) Field of Search ................. 416/228, 223 R, 416/237, 231 B, 235; 415/119

(56) References Cited

U.S. PATENT DOCUMENTS

| | | | |
|---|---|---|---|
| 3,044,559 | * | 7/1962 | Chajmik ................................ 416/228 |
| 4,102,600 | * | 7/1978 | Schwab .................................. 416/91 |
| 4,636,143 | * | 1/1987 | Zeides ................................... 416/228 |

FOREIGN PATENT DOCUMENTS

| | | |
|---|---|---|
| 56-167599A | 12/1981 | (JP) . |
| 64-16498A | 1/1989 | (JP) . |
| 64-22693A | 1/1989 | (JP) . |
| 2-60898A | 3/1990 | (JP) . |
| 3-66198B | 10/1991 | (JP) . |
| 4-176795A | 6/1992 | (JP) . |
| 4-262994A | 9/1992 | (JP) . |

* cited by examiner

Primary Examiner—Christopher Verdier
Assistant Examiner—Rhonda Barton
(74) Attorney, Agent, or Firm—Smith, Gambrell & Russell, LLP

(57) ABSTRACT

A rotor blade (1) comprises a main blade (2) having a substantially fixed chord length (C), a front tip blade (3) having a chord length (C1) smaller than that of the main blade and connected to the main blade so that a front edge (3a) thereof is continuous with a front leading edge (2a) of the main blade, and a rear tip blade (4) having a chord length (C2) greater than that of the front tip blade and connected to the main blade so that a trailing edge thereof is continuous with a trailing edge of the main blade. The blade incidence angle ($\theta 1$, $\theta 2$), the washout angle ($\delta 1$, $\delta 2$) and so on of at least either the front tip blade or the rear tip blade, the respective lengths (R1, R2) of the front tip blade (3) and the rear tip blade (4), and the anhedral angle ($\eta$) of the rear tip blade (4) are determined so that tip vortices generated by the front tip blade (3) and the rear tip blade (4) cancel each other to suppress BVI noise.

10 Claims, 11 Drawing Sheets

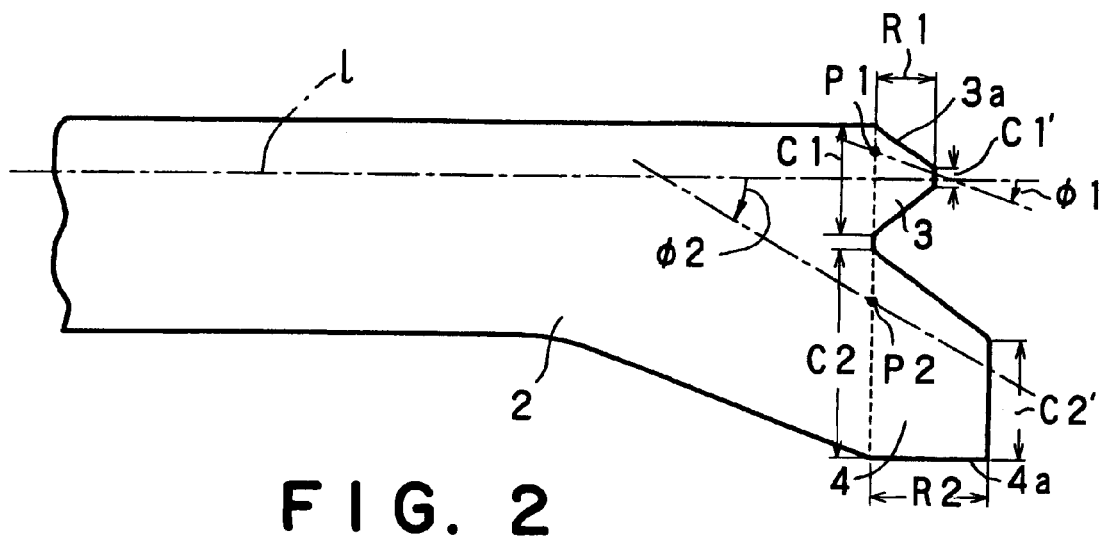
F I G. 2
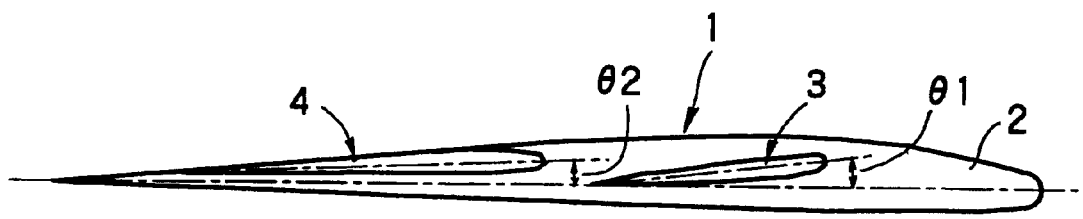
F I G. 3
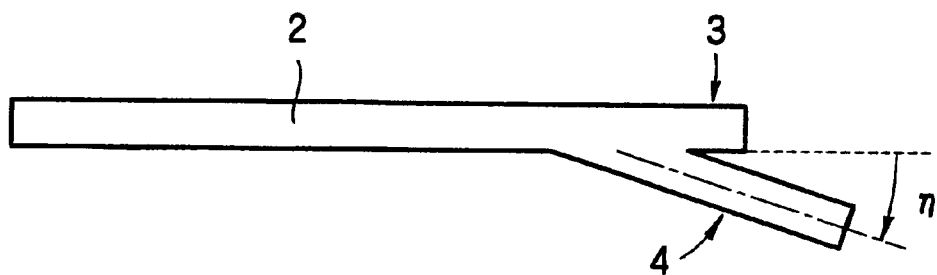
F I G. 4

TRANSITION OF SEPARATION

AREA WHERE STALL ESCAPES
FOR SUPPORTING LIFT

ROTOR BLADE FOR ROTARY-WING AIRCRAFT

BACKGROUND OF THE INVENTION

1. Field of the Invention

The present invention relates to a rotor blade for a rotary-wing aircraft, designed to suppress BVI (Blade Vortex Interaction) noise which is generated by an interaction of a succeeding rotor blade with tip vortices generated by the tip of a preceding rotor blade.

2. Description of the Related Art

When a rotary-wing aircraft, such as a helicopter, lands, a succeeding rotor blade of a rotary wing interacts with tip vortices generated by the tip of a preceding rotor blade to generate a BVI noise. It is known that the intensity of the BVI noise generated by the rotary-wing aircraft is dependent on the plane shape of a tip part of the rotor blade that generates the tip vortices.

Referring to FIG. 16, a rotary wing 20 included in a rotary-wing aircraft comprises a plurality of rotor blades 21 each having a substantially rectangular shape, and rotates about a rotational axis. When the rotary wing 20 of the rotary-wing aircraft rotates in the direction of the arrow D while the rotary-wing aircraft is advancing in the direction of the arrow F, tip trailing edge vortices 22 are generated by the preceding rotor blade 21a. When the rotary-wing aircraft descends for landing, the tip trailing edge vortices 22 generated by the preceding rotor blade 21a descend with a delay. Therefore, the succeeding rotor blade 21b interacts with the tip trailing edge vortices 22 to generate BVI noise. Since tip trailing edge vortices 22 generated by the rotor blades do not start descending at the instant the vortices are generated, the rotor blades are affected by the downwash of the vortices caused by themselves or the downwash of the vortices caused by the preceding rotor blade 21a when the rotary-wing aircraft hovers. The dynamic pressure of air acting on the rotor blade reaches a maximum value at the tip of the rotor blade, and the hovering performance of the rotary-wing aircraft is dependent on the plane shape of a tip part of the rotor blade.

A supersonic flow region is created around the leading edge of the rotor blade in a forward turning motion due to the sum of the tangential velocity of the rotor blade and a component of the velocity of the forward motion of the rotary-wing aircraft in a direction tangent to the path of the rotor blade while the rotary-wing aircraft is in high-speed forward flight. Consequently, power loss at the tip of the rotor blade increases to a maximum and a large aerodynamic pitching moment is produced at the tip of the rotor blade. Therefore, the performance of the rotary-wing aircraft and the aerodynamic balance of the rotor blade are dependent on the plane shape of the tip part of the rotor blade. Moreover, impulsive HSI (High Speed Impulsive) noise is generated due to the compression of air particularly by a tip part of the rotor blade in a forward turning motion while the rotary-wing aircraft is in high-speed forward flight. Thus, the intensity of the HSI noise generated by the rotary-wing aircraft is dependent on the plane shape of the tip part of the rotor blades. Many studies of the plane shape of the tip part of rotor blades have been made to design a rotor blade capable of exhibiting high performance, of reducing noise and of securing appropriate aerodynamic balance.

A rotor blade for a rotary wing disclosed in JP 56-167599A has a tip part having a sweepback angle, a taper and an anhedral angle selectively determined to improve the performance of the rotor blade during hovering. In this prior art rotor blade, the sweepback angle reduces air velocity toward the tip to reduce the load on the tip and the intensity of tip trailing edge vortices which are generated during hovering, and the taper reduces chord length toward the tip of the rotor blade. As a result, the chord length decreases from the root toward the tip of the rotor blade so that the chord length of the tip is about half that of the root to reduce the area of a tip part of the rotor blade for the further reduction of the load on the tip and the intensity of tip trailing edge vortices during hovering. Thus, the anhedral angle warps down a tip part of a length corresponding to 4% of the radius of the rotary wing to shift the tip trailing edge vortices generated by the preceding rotor blade to a position apart from the succeeding rotor blade.

A rotor blade disclosed in JP 3-66198B has a tip part in which the respective sweepback angles of the leading edge and the trailing edge are determined so that the leading edge and the trailing edge of the tip part extend outward at different angles, respectively, to reduce the intensity of impulse waves due to the compression of air and to reduce the HSI noise during the forward flight of the rotary-wing aircraft.

A rotor blade disclosed in JP 64-16498A has a tip part inclined at a dihedral angle, and a part adjacent to the tip part inclined at an anhedral angle to improve the hovering performance of the rotary-wing aircraft and to suppress the torsional distortion of the rotor blade during high-speed forward flight.

A rotor blade disclosed in JP 64-22693A, similarly to that disclosed in JP 3-66198B, has a tip part in which the respective sweepback angles of the leading edge and the trailing edge are determined so that the leading edge and the trailing edge of the tip part extend outward at different angles, respectively, to improve the flight performance of the rotary-wing aircraft.

A rotor blade disclosed in JP 2-60898A has a swept-back tip part capable of reducing or removing aerodynamic pitching moment. This rotor blade has a root part attached to a rotor head, a main part extending from the root part and having a blade profile of a predetermined chord length, a swept-back tip part determining blade width and extending from the outer end of the main part, and a droop for changing the distribution of bound vortices of air currents in the direction of the width of the blade over the edge of the tip part to reduce the aerodynamic pitching moment of the rotor blade.

A rotary wing employed in a rotary-wing aircraft disclosed in JP 4-176795A reduces resistance and improves flight efficiency by the effect of sweepback angle, suppresses separation by the double delta effect of two swept-back parts, delays the stalling of a rotor blade in backward turning motion for the further stabilization of high-speed flight.

A rotor blade disclosed in JP 4-262994A has a mean chord length greater than 50% of the chord length of its main part, and is provided with a tip blade of a span length greater than 50% of the chord length of the main part to generate two tip vortices of substantially the same intensity to suppress acoustic shocks and BVI noise. FIG. 17 shows an end part 30 of this rotor blade in a plan view. The end part 30 of this rotor blade has a tip part 32 having a leading edge 31 and a trailing edge 33 determining the chord length of the tip part 32 perpendicular to a reference axis, and a tip blade 34 extending from the tip part 32. As shown in FIG. 18, vortices generated by this rotor blade is divided into vortices 34a shed from the tip blade 34 and vortices 35a shed from the tip 35 of the tip part 32 and, consequently, BVI noise is suppressed. Thus tip blade 34 of the rotor blade disclosed in JP 4-262994A has a span length greater than 50% of the chord length of the main part of the rotor blade to generate the two vortices of substantially the same intensity so that the two vortices remain separated from each other for the longest possible distance as indicated in FIG. 19. Therefore, the tip blade has an elongate shape and hence contrivance is necessary to strengthen the joint of the root of the tip blade 34 and the tip of the main part 32 particularly.

SUMMARY OF THE INVENTION

The present invention has been made in view of that respects and it is therefore an object of the present invention to provide a rotor blade for a rotary-wing aircraft, based on a new principle and incorporating new contrivance to reduce noise resulting from the interaction of the rotor blade with tip vortices by reducing the intensity of tip vortices.

According to one aspect of the present invention, a rotor blade for a rotary-wing aircraft comprises a main blade having a substantially fixed chord length, a front tip blade having a chord length smaller than that of the main blade and connected to the main blade so that the front edge thereof is continuous with the front edge of the main blade, and a rear tip blade having a chord length greater than that of the front tip blade and connected to the main blade so that the trailing edge thereof is continuous with the trailing edge of the main blade. Tip vortices generated by the front tip blade interferes with tip vortices generated by the rear tip blade and still bound on the surface of the rear tip blade to suppress BVI noise by reducing the intensity of the tip vortices generated by the rear tip blade by the tip vortices generated by the front tip blade.

In this rotor blade, the difference in span length between the front tip blade and the back tip blade may be 40% or less of the substantially fixed chord length of the main blade. Thus the tip vortices generated by the front tip blade can be made to interfere with tip vortices generated by the rear tip blade and still bound on the surface of the rear tip blade to reduce the intensity of the tip vortices.

In this rotor blade, at least one of the front tip blade and the rear tip blade may be swept-back at a sweepback angle of 60° or below to suppress HSI noise.

In this rotor blade, the front tip blade may be tapered in a taper less than 0.7, and the rear tip blade may be tapered in a taper less than 0.7 to reduce the intensity of the tip vortices and to suppress HSI noise further effectively.

In this rotor blade, at least one of the front tip blade and the rear tip blade may be attached to the main blade and a blade incidence angle in the range of −5° to +5°. Thus, the intensity of tip vortices can be further efficiently reduced.

In this rotor blade, at least one of the front tip blade and the rear tip blade may be twisted with respect to a direction along the length so as to form a washout angle in the range of −5° to +5°. Thus the intensity of tip vortices can be further efficiently reduced.

In this rotor blade, the anhedral angle of the rear tip blade may be 10° or below. Thus the intensity of tip vortices can be further efficiently reduced.

In this rotor blade, the 25%-chord line of the front tip blade may be on the front side of the 25%-chord line of the main blade having a substantially fixed chord at the joint of the front tip blade and the main blade. Thus the appropriate aerodynamic balance can be secured.

In this rotor blade, part of the front edge of the main blade near the joint of the front tip blade and the main blade may be formed in a forward convex curve. Thus the propagation of separation toward the tip of the rotor blade while the rotary-wing aircraft is in high-speed forward flight with the rotary wing thereof rotating at a low rotating speed to reduce noise can be prevented.

In this rotor blade, the front tip blade may be connected to the main blade so as to be able to pitch about an axis extending in the direction of the span, and the front tip blade may be driven for pitching by a driving means. Thus, the blade incidence angle of the front tip blade can be positively controlled by a front tip blade operating mechanism according to the azimuth of the rotor blade. Thus the intensity of tip vortices can be further efficiently reduced.

The above and other objects, features and advantages of the present invention will become more apparent from the following description taken in connection with the accompanying drawings.

BRIEF DESCRIPTION OF THE DRAWINGS

FIG. 2 is an enlarged plan view of an end portion of the rotor blade of FIG. 1;

FIG. 3 is an end view of the rotor blade of FIG. 1;

FIG. 4 is a rear view of the rotor blade of FIG. 1;

DESCRIPTION OF THE PREFERRED EMBODIMENTS

Figure 1:
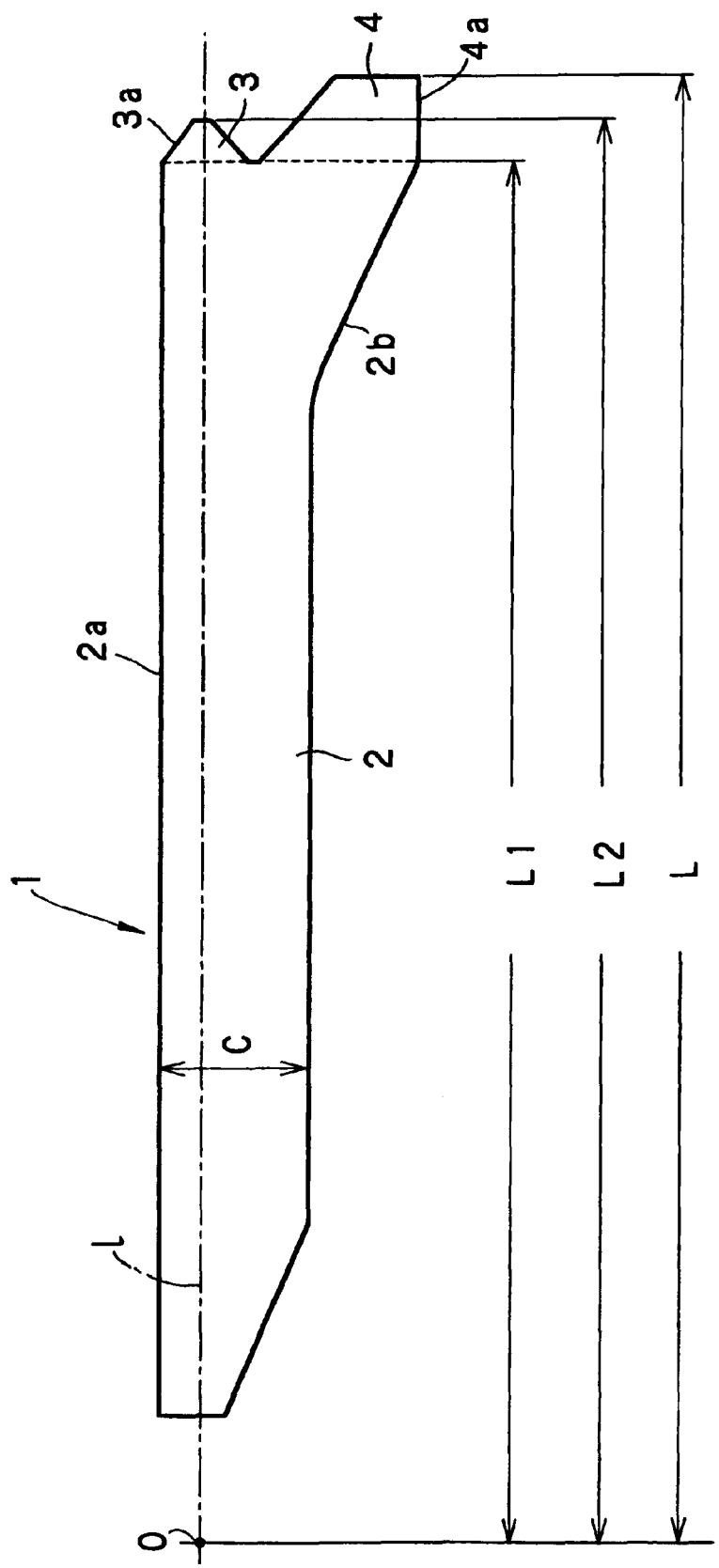
FIG. 1 is a schematic plan view of a rotor blade in a first embodiment according to the present invention for a rotary-wing aircraft.

FIG. 1 shows one of a plurality of rotor blades 1 in a first embodiment according to the present invention for a rotary-wing aircraft. The plurality of rotor blades 1 are attached to a rotor hub not shown to constitute a rotary wing. The rotor blade 1 has a main blade 2 having a substantially fixed chord length $\underline{C}$, a front tip blade 3 having a front edge 3$a$ continuous with a front edge 2$a$ of the main blade 2, and a rear tip blade 4 having a rear edge 4$a$ continuous with a rear edge 2$b$ of the main blade 2. The distance between a rotational center $\underline{O}$ of the rotary wing and the tip of the rotor blade 1, i.e., the radius of the rotary wing, is a radial distance $\underline{L}$, the distance between the rotational center $\underline{O}$ of the rotary wing and the outer end of the main blade 2 is a radial distance $\underline{L\,1}$, and the distance between the center $\underline{O}$ and the tip of the front tip blade 3 is a radial distance $\underline{L\,2}$. The radial distance $\underline{L\,1}$ between the center $\underline{O}$ and the outer end of the main blade 2 is in the range of 80% to 100% of the radial distance $\underline{L}$ equal to the radius of the rotary wing.

As shown in FIG. 2 the front tip blade 3 has a length R1=(L2−L1). The sweepback angle at a 25%-chord position $\underline{P\,1}$ on the chord having the chord length $\underline{C\,1}$ is $\phi 1$. The chord length $\underline{L\,1}$ of the front tip blade 3 is shorter than the chord length $\underline{C}$ of the main blade 2. The front tip blade 3 is swept back at the sweepback angle $\phi 1$ to reduce the air compressing effect of the front tip blade 3. Pitching moment in a head-down direction about the extension of the 25%-chord line increases if the sweepback angle $\phi 1$ is excessively large and Mach number at the tip of the rotor blade in a forward turning motion is therefore on the order of 1. In consideration of this, the sweepback angle $\phi 1$ of the front tip blade 3 is 60° or below from the viewpoint of suppressing the air compressing effect of the front tip blade 3.

If the pitching moment in the head-down direction about the extension of the 25%-chord line increases, a dynamically unstable phenomenon, such as flutter or divergence, occurs in the rotor blade 1. It is effective in reducing the pitching moment in the head-down direction that the front tip blade 3 is on the front side of the 25%-chord line of the rotor blade 1. Therefore, the front tip blade 3 is formed so that the 25%-chord point P1 of the front tip blade is on the front side of an extension l of the 25%-chord line of the main blade 2 having the substantially fixed chord.

The tip vortices can be reduced to the least possible extent by uniformly tapering the rotor blade from the root toward the tip of the same at a taper ratio. Tapering the rotor blade further reduces the HSI noise as well as tip vortices. Taper ratio is the ratio of the chord length of the tip of the rotor blade to that of the root of the same. In view of the foregoing fact, the taper ratio C1'/C1 of the front tip blade 3 is in the range of 0 to 0.7.

Figure 20:
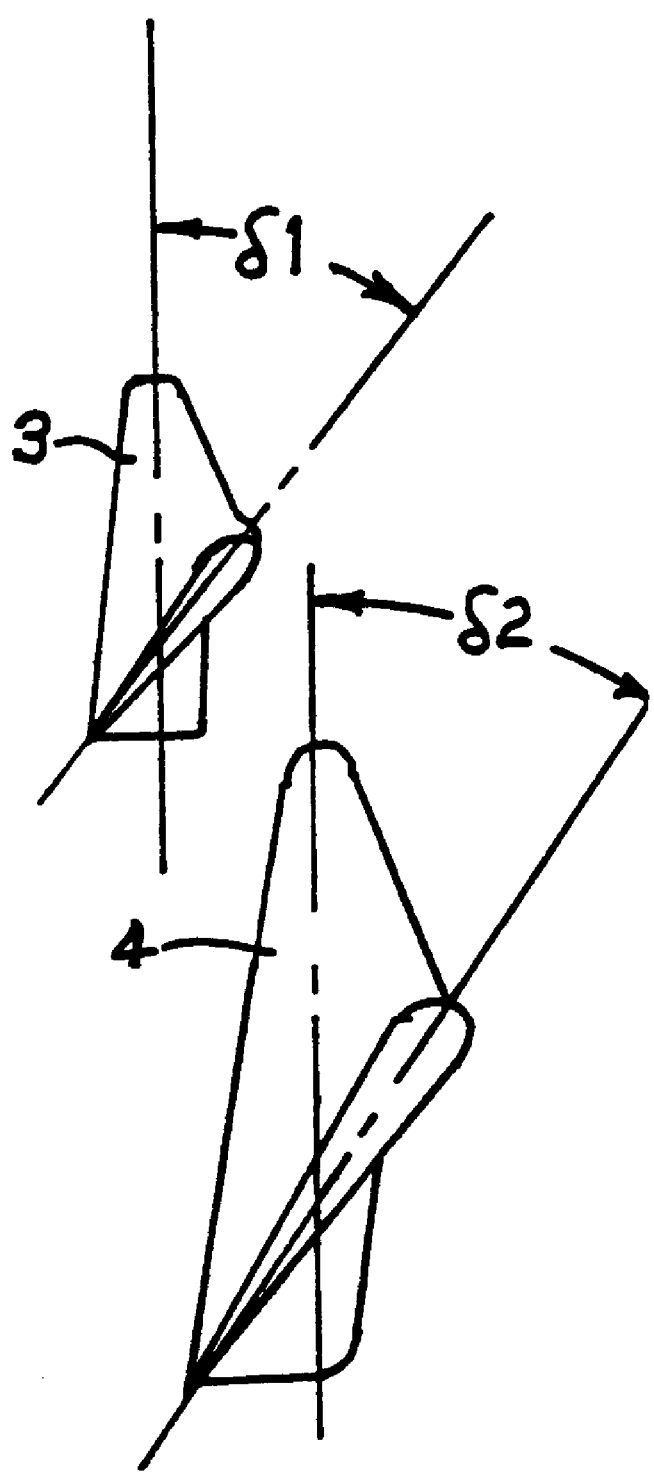
FIG. 20 is an end view of the end portion of FIG. 2, showing the washout angles of the tip blades.

The intensity of tip vortices generated by the front tip blade 3 and that of tip vortices generate by the rear tip blade 4 must be adjusted properly to make those tip vortices cancel each other efficiently. The blade incidence angle $\phi 1$ (FIG. 3) is determined so that the tip vortices generated by the front tip blade 3 have an appropriate intensity relative to that of the tip vortices generated by the rear tip blade 4. An excessively large blade incidence angle $\phi 1$ increases drag. As shown in FIG. 3, the front tip blade 3 is connected to the tip of the main blade 2 at the blade incidence angle $\phi 1$ in the range of −5° (leading edge down) and +5° (leading edge up). Similarly, the front tip blade 3 and the rear tip blade 4 are twisted at washout angles to make the tip vortices generated by the front tip blade 3 and the rear tip blade 4 cancel each other efficiently. Excessive twisting increases drag. As shown in FIG. 20, the washout angle $\delta 1$ of the front tip blade 3 is in the range of −5° (leading edge down) to +5° (leading edge up).

As shown in FIG. 2, the rear tip blade 4 has a length R2=L−L2, a chord length $\underline{C\,2}$ at its root, a chord length C2' at its tip, and the sweepback angle of the rear tip blade 4 at a 25%-chord position $\underline{P\,2}$ on the chord of the chord length $\underline{C\,2}$ is $\phi 2$. According to published experimental data, the radius of tip vortices, in general, is about 20% of the chord length of the rotor blade. Therefore, the length difference (R2−R1) between the front tip blade 3 and the rear tip blade 4, i.e., the difference between the length R2 of the rear tip blade 4 and the length $\underline{R\,1}$ of the front tip blade 3, is 40%, that is, 20% (front tip blade tip vortices) +20% (rear tip blade tip vortices) of the chord length $\underline{C}$ of the main blade 2 at the largest to make the tip vortices generated by the front tip blade 3 and those generated by the rear tip blade 4 cancel each other; that is, the length difference (R2−R1) between the rear tip blade 4 and the front tip blade 3 is in the range of 0% to 40% of the chord length $\underline{C}$ of the main blade 2.

The rear tip blade 4 is swept back at the sweepback angle $\phi 2$ to reduce the air compressing effect of the rear tip blade 4. Pitching moment in a head-down direction about the extension of the 25%-chord line increases if the sweepback angle $\phi 2$ is excessively large and Mach number at the tip of the rotor blade in a forward turning motion is on the order of 1. Therefore, the sweepback angle $\phi 2$ of the rear tip blade 4 is 60° or below from the viewpoint of suppressing the air compressing effect of the rear tip blade 4. The tip vortices can be reduced to the least possible extent by uniformly tapering the rotor blade from the root toward the tip of the same at a taper ratio. Tapering the rotor blade further reduces HSI noise as well as tip vortices. In view of the foregoing fact, the taper ratio C2'/C2 of the rear tip blade 4 is in the range of 0 to 0.7.

The intensity of tip vortices generated by the front tip blade 3 and that of tip vortices generate by the rear tip blade 4 must be adjusted properly to make those tip vortices cancel each other efficiently. The blade incidence angle $\theta 2$ is determined so that the tip vortices generated by the rear tip blade 4 have an appropriate intensity relative to that of the tip vortices generated by the front tip blade 3. An excessively large blade incidence angle $\theta 2$ increases drag. As shown in FIG. 3, the rear tip blade 4 is connected to the tip of the main blade 2 at the blade incidence angle $\theta 2$ in the range of −5° (leading edge down) and +5° (leading edge up). Similarly, the front tip blade 3 and the rear tip blade 4 are twisted at washout angles to make the tip vortices generated by the front tip blade 3 and the rear tip blade 4 cancel each other efficiently. Excessive twisting increases drag. The washout angle $\delta 2$ of the rear tip blade 4 is in the range of −5° (leading edge down) to +5° (leading edge up).

The position of the rear tip blade 4 relative to the position of tip vortices generated by the front tip blade 3 must be determined properly to make the vortices generated by the front tip blade 3 and the rear tip blade 4 cancel each other efficiently. The rear tip blade 4 is inclined at an anhedral angle η (FIG. 4). If the anhedral angle η is excessively large, vibrations will be excited during forward flight. Therefore, the anhedral angle η of the rear tip blade 4 is in the range of 0° to −10° (downward inclination).

Figure 5:
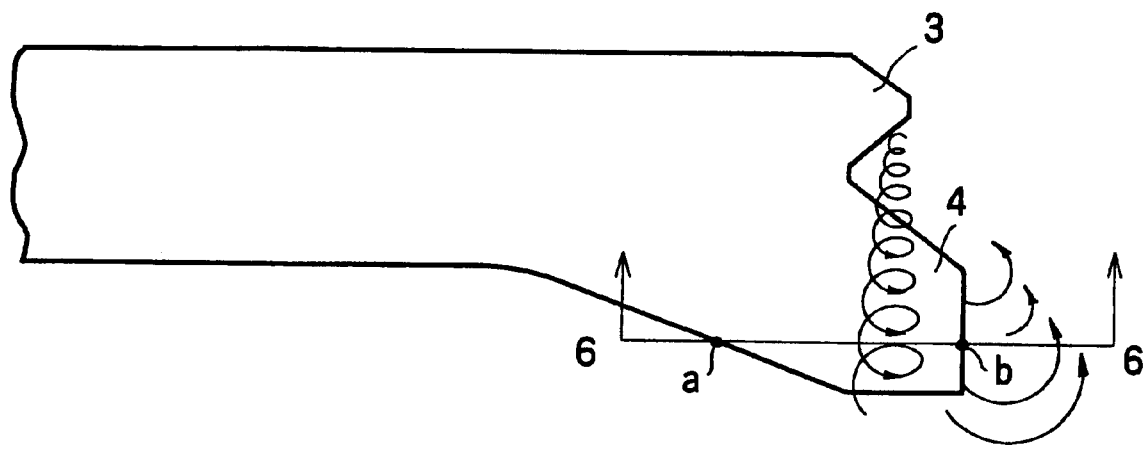
FIG. 5 is a view showing tip vortices generated by a front tip blade included in the rotor blade of FIG. 1.
Figure 6:
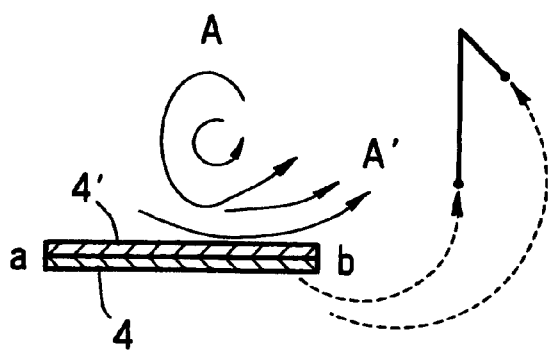
FIG. 6 is a sectional view taken on line 6—6 in FIG. 5.

FIG. 5 is a plan view of the rotor blade typically showing the flow of air behind the front tip blade 3 visualized by wind tunnel test. As is obvious from FIG. 5, tip vortices generated by the front tip blade 3 during a landing motion of the rotary-wing aircraft interact with the rear tip blade 4 to reduce the intensity of tip vortices generated by the rear tip blade 4. As shown in FIG. 6, flows A' among rising currents $\underline{A}$ caused by the tip vortices generated by the front tip blade 3 flow along the upper surface 4' of the rear tip blade 4 toward the edge of the rear tip blade 4 to sweep tip vortices being generated by the rear tip blade 4 outward and, consequently, the intensity of the tip vortices generated by the rear tip blade 4 is reduced. Tip vortices of small radii are generated around the tip of the rear tip blade 4 if the flows A' do not flow along the upper surface 4' of the rear tip blade 4, and tip vortices of large radii are generated around the tip of the rear tip blade 4 if the flows A' flow along the upper surface 4' of the rear tip blade 4. Thus, the radii of the tip vortices generated by the rear tip blade 4 are increased by the sweeping action of the flows A' and, consequently, the tangential speed of the vortices is reduced to reduce the intensity of the tip vortices generated by the rear tip blade 4.

Figure 7:
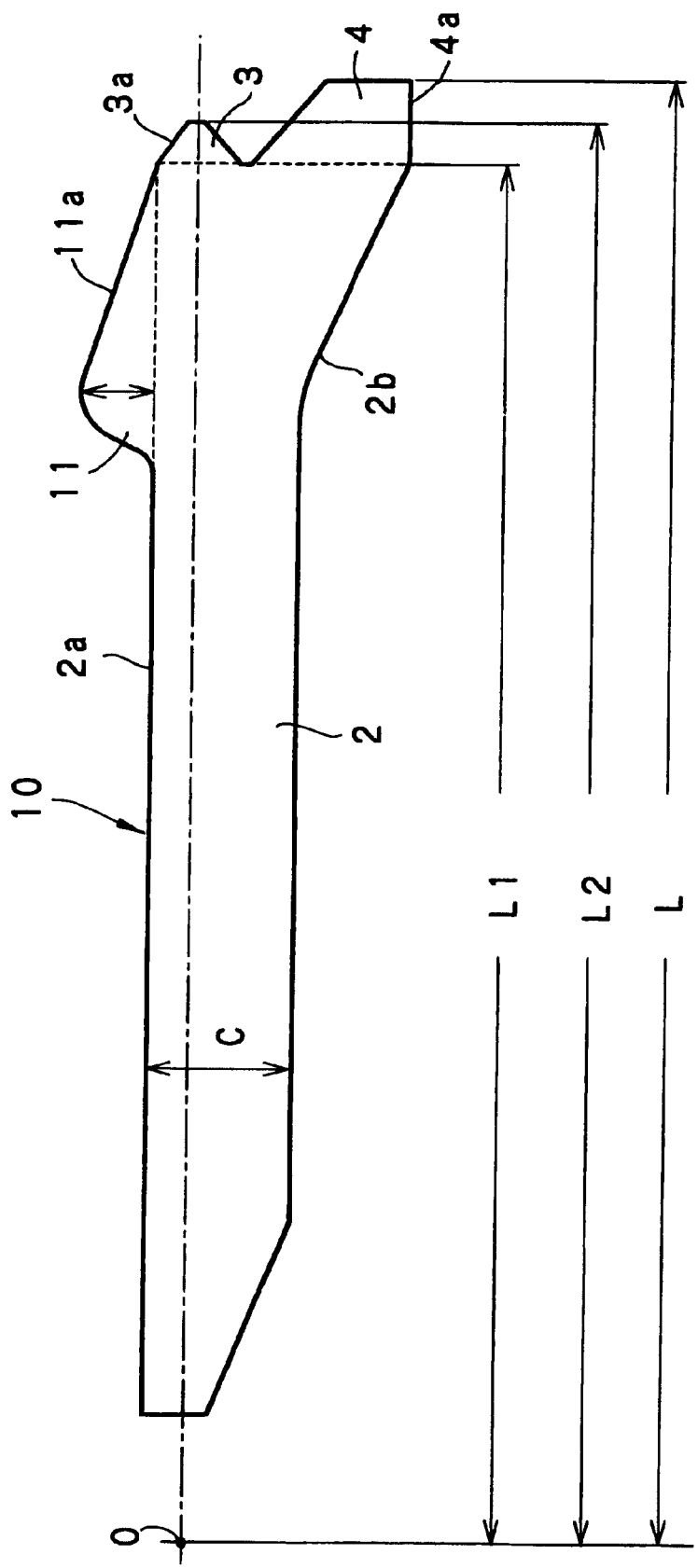
FIG. 7 is a schematic plan view of a rotor blade in a second embodiment according to the present invention for a rotary-wing aircraft.

FIG. 7 is a schematic plan view of a rotor blade 10 in a second embodiment according to the present invention for a rotary-wing aircraft. The rotor blade 10 shown in FIG. 7 is substantially the same in shape as the rotor blade 1 shown in FIG. 1, except that a main blade 2 of the former rotor blade 10 has a forward convex part 11. The forward convex part 11 of the main blade 10 starts protruding from the leading edge 2a of the main blade 2 at a position on the leading edge 2a at a distance from the rotational center O of the rotor blade 10 in the range of 70% to 100% of the distance between the rotational center O of turning of the rotor blade 10 and the tip of the rotor 10. The maximum height of the forward convex part 11 is in the range of 0% to 50% of the chord length C of the main blade 2. The leading edge 11a of the forward convex part 11 merges into the leading edge 2a of the main blade 2 and the leading edge 3a of a front tip blade 3.

Figure 8:
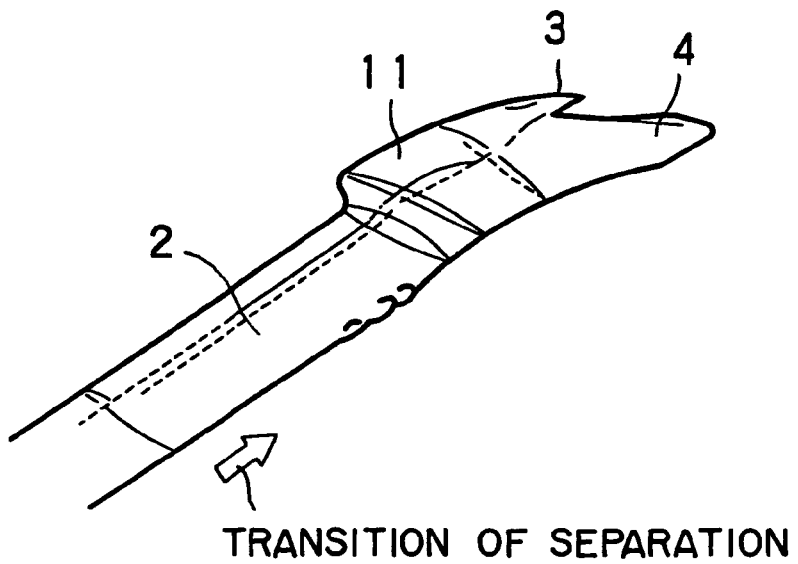
FIG. 8 is a perspective view explaining the propagation of separation toward the tip of the rotor blade.
Figure 9:
FIG. 9 is a perspective view explaining vortices arresting the propagation of separation.

Separation propagates toward the tip of the rotor blade 10 as shown in FIG. 8 while the rotary-wing aircraft is in high-speed forward flight with the rotary wing thereof rotating at a low rotational speed to reduce noise. The forward convex part 11 of the rotor blade 10 generates vortices for preventing the propagation of separation in a direction along the chord of the rotor blade 10 as shown in FIG. 9, so that the occurrence of stall advancing from the root toward the tip of the rotor blade 10 in backward turning motion is prevented by the tip of the rotor blade 10.

Examples of the rotor blades of the present invention will be described hereinafter.

Figure 10:
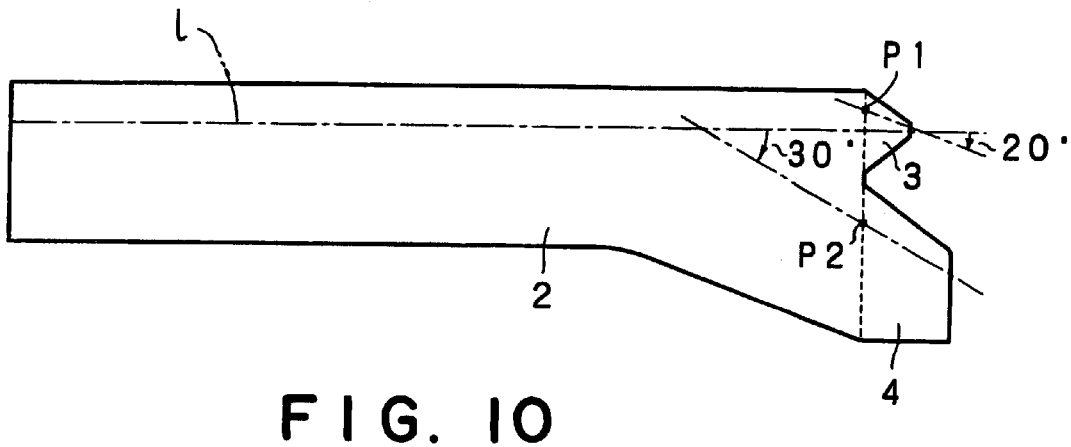
FIG. 10 is a plan view of a rotor blade in Example 1 of the present invention.

Referring to FIG. 10, in a rotor blade 1 according to the present invention in Example 1, the difference between the radial distance $L2$ of the tip of a front tip blade 3 from the rotational center O of the rotor blade and the radial distance L of the tip of a rear tip blade 4, namely, the tip of the rotor blade 1, from the center O of the rotor blade 1 is 25% of the substantially fixed chord length of a main blade 2. The tip of the front tip blade 3 is on the radially inner side at a distance (L−L2) from the tip of the rear tip blade 4. The sweepback angle φ1 of the front tip blade 3 is 20° and the sweepback angle φ2 of the rear tip blade 4 is 30°. The taper ratio of the front tip blade 3 is 0.15 and that of the rear tip blade 4 is 0.55. The 25%-chord point P1 on the root of the front tip blade 3 is on the front side of a 25%-chord line passing the 25%-chord point on the root of the rotor blade 1. The respective blade incidence angles of the front tip blade 3 and the rear tip blade 4 relative to the main blade 2 are about 0°. The respective washout angles between the root and the tip of the front tip blade 3 and the rear tip blade 4 are about 0°. The anhedral angle of the rear tip blade 4 relative to the front tip blade 3 is about 0°.

Figure 11:
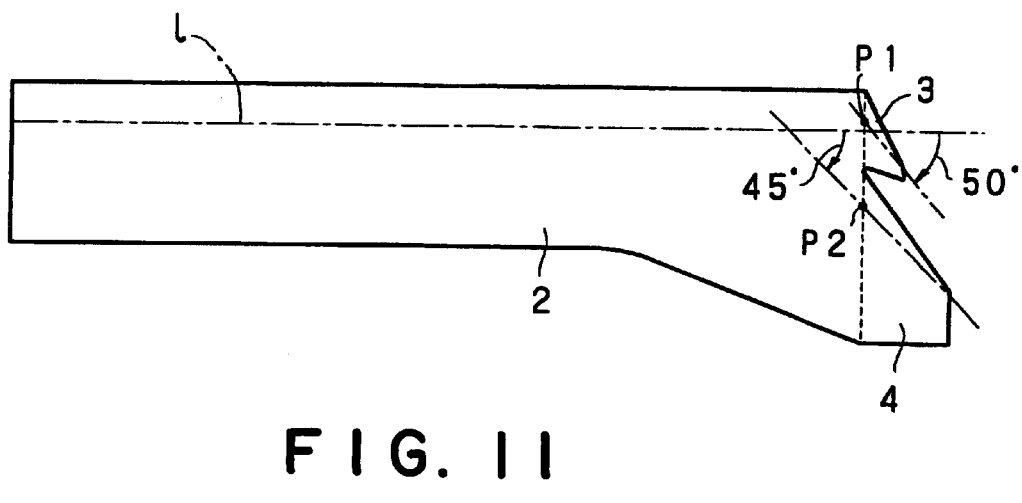
FIG. 11 is a plan view of a rotor blade in Example 2 of the present invention.

Referring to FIG. 11, in a rotor blade 1 according to the present invention in Example 2, the difference between the radial distance $L2$ of the tip of a front tip blade 3 from the rotational center O of the rotor blade and the radial distance L of the tip of a rear tip blade 4, namely, the tip of the rotor blade 1, from the center O of the rotor blade 1 is 25% of the substantially fixed chord length of a main blade 2. The tip of the front tip blade 3 is on the radially inner side at a distance (L−L2) from the tip of the rear tip blade 4. The sweepback angle φ1 of the front tip blade 3 is 50° and the sweepback angle φ2 of the rear tip blade 4 is 45°. The taper ratio of the front tip blade 3 is 0.20 and that of the rear tip blade 4 is 0.25. The 25%-chord point P1 on the root of the front tip blade 3 is on the front side of a 25%-chord line passing the 25%-chord point on the root of the rotor blade 1. The respective blade incidence angles of the front tip blade 3 and the rear tip blade 4 relative to the main blade 2 are about 0°. The respective washout angles between the root and the tip of the front tip blade 3 and the rear tip blade 4 are about 0°. The anhedral angle of the rear tip blade 4 relative to the front tip blade 3 is about 0°.

Figure 12:
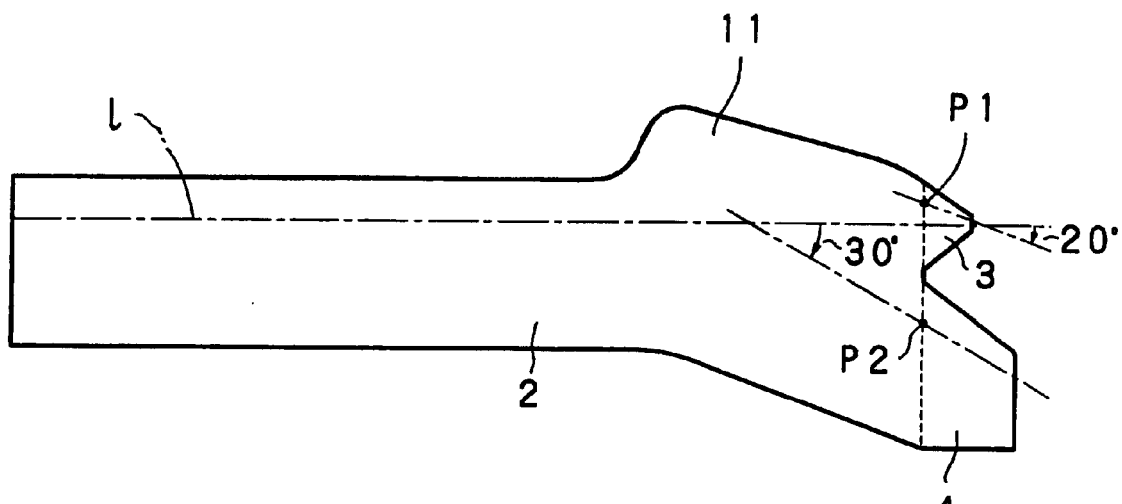
FIG. 12 is a plan view of a rotor blade in Example 3 of the present invention.

Referring to FIG. 12, in a rotor blade 1 according to the present invention in Example 3, the difference between the radial distance $L2$ of the tip of a front tip blade 3 from the rotational center O of the rotor blade and the radial distance L of the tip of a rear tip blade 4, namely, the tip of the rotor blade 1, from the center O of the rotor blade 1 is 25% of the substantially fixed chord length of a main blade 2. The tip of the front tip blade 3 is on the radially inner side at a distance (L−L2) from the tip of the rear tip blade 4. The sweepback angle φ1 of the front tip blade 3 is 20° and the sweepback angle φ2 of the rear tip blade 4 is 30°. The taper ratio of the front tip blade 3 is 0.15 and that of the rear tip blade 4 is 0.55. The 25%-chord point $P1$ on the root of the front tip blade 3 is on the front side of a 25%-chord line passing the 25%-chord point on the root of the rotor blade 1. A forward convex part 11 formed in a main blade 2 starts protruding from the leading edge of the main blade 2 at a position on the leading edge at a radial distance from the rotational center O of the rotor blade 10 equal to 75% of the radial distance L between the center O of the rotor blade 10 and the tip of the rotor 10. The maximum height of the forward convex part 11 is equal to 40% of the substantially fixed chord length C of the main blade 2. The respective blade incidence angles of the front tip blade 3 and the rear tip blade 4 relative to the main blade 2 are about 0°. The respective washout angles between the root and the tip of the front tip blade 3 and the rear tip blade 4 are about 0°. The anhedral angle of the rear tip blade 4 relative to the front tip blade 3 is about 0°.

Figure 13:
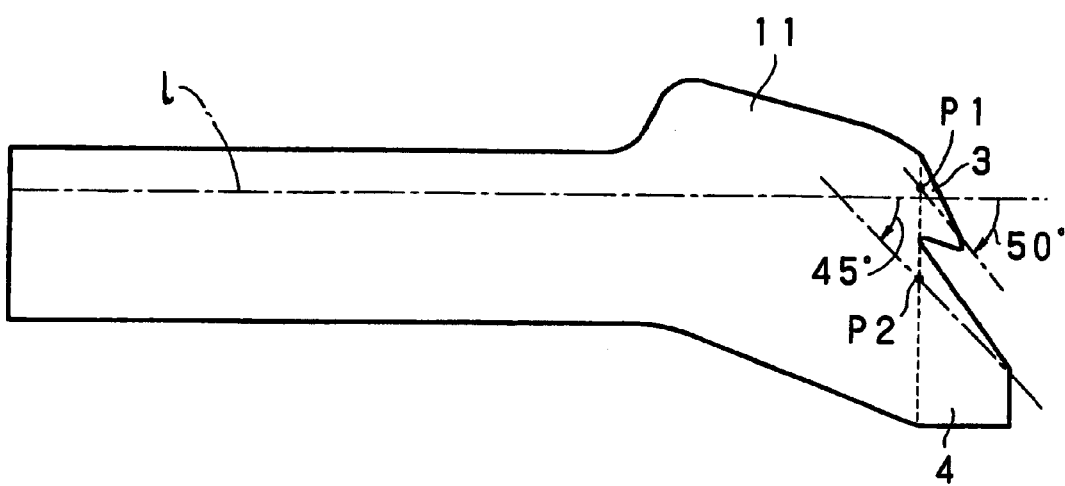
FIG. 13 is a plan view of a rotor blade in Example 4 of the present invention.

Referring to FIG. 13, in a rotor blade 1 according to the present invention in Example 4, the difference between the radial distance $L2$ of the tip of a front tip blade 3 from the rotational center O of the rotor blade and the radial distance L of the tip of a rear tip blade 4, namely, the tip of the rotor blade 1, from the center O of the rotor blade 1 is 25% of the substantially fixed chord length of a main blade 2. The tip of the front tip blade 3 is on the radially inner side at a distance (L−L2) from the tip of the rear tip blade 4. The sweepback angle φ1 of the front tip blade 3 is 50° and the sweepback angle φ2 of the rear tip blade 4 is 45°. The taper ratio of the front tip blade 3 is 0.20 and that of the rear tip blade 4 is 0.25. The 25%-chord point P1 on the root of the front tip blade 3 is on the front side of a 25%-chord line passing the 25%-chord point on the root of the rotor blade. A forward convex part 11 formed in a main blade 2 starts protruding from the leading edge of the main blade 2 at a position on the leading edge at a radial distance from the rotational center O of the rotor blade 10 equal to 75% of the radial distance L between the rotational center O of the rotor blade 10 and the tip of the rotor blade 10. The maximum height of the forward convex part 11 is equal to 40% of the substantially fixed chord length C of the main blade 2. The respective blade incidence angles of the front tip blade 3 and the rear tip blade 4 relative to the main blade 2 are about 0°. The respective washout angles between the root and the tip of the front tip blade 3 and the rear tip blade 4 are about 0°. The anhedral angle of the rear tip blade 4 relative to the front tip blade 3 is about 0°.

Figure 14:
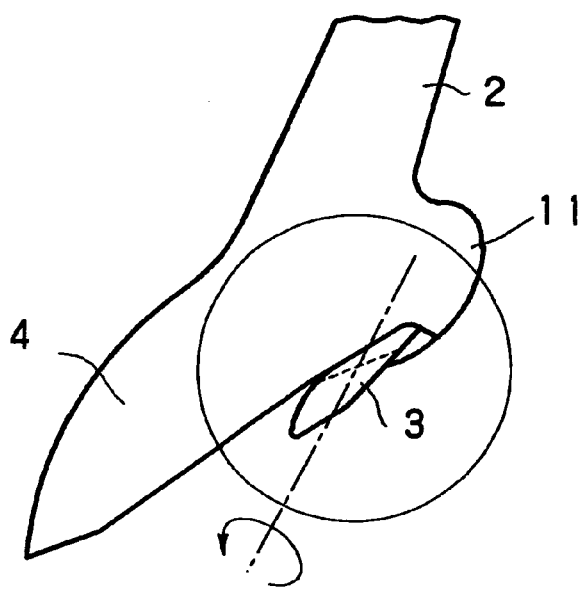
FIG. 14 is a view of a rotor blade in a modification of a rotor blade according to the present invention.
Figure 15:
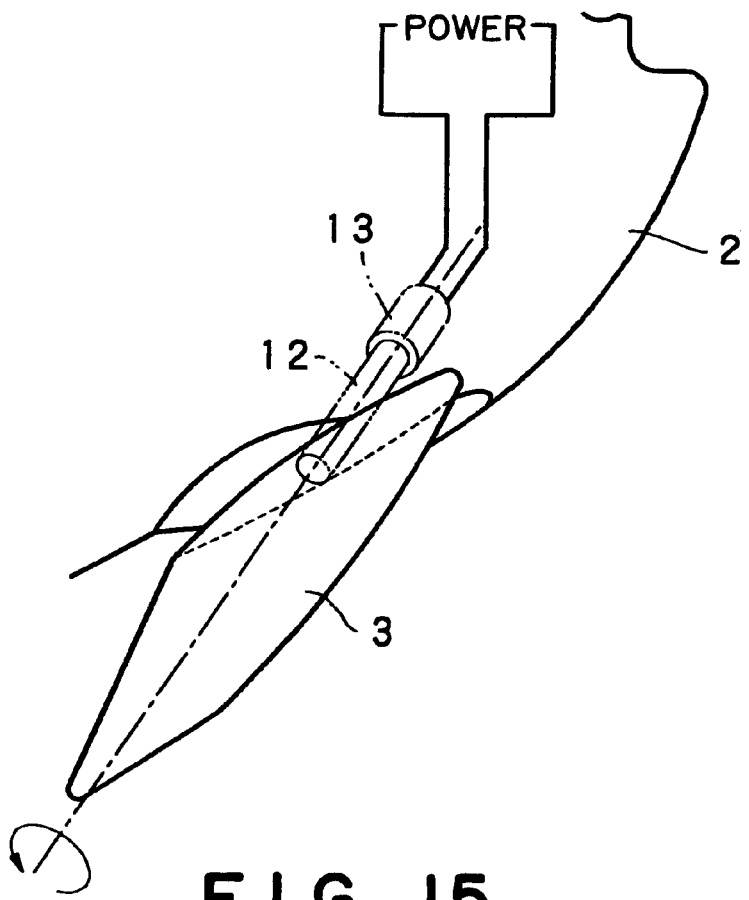
FIG. 15 is a schematic view of an operating device for operating the rotor blade of FIG. 14.
Figure 16:
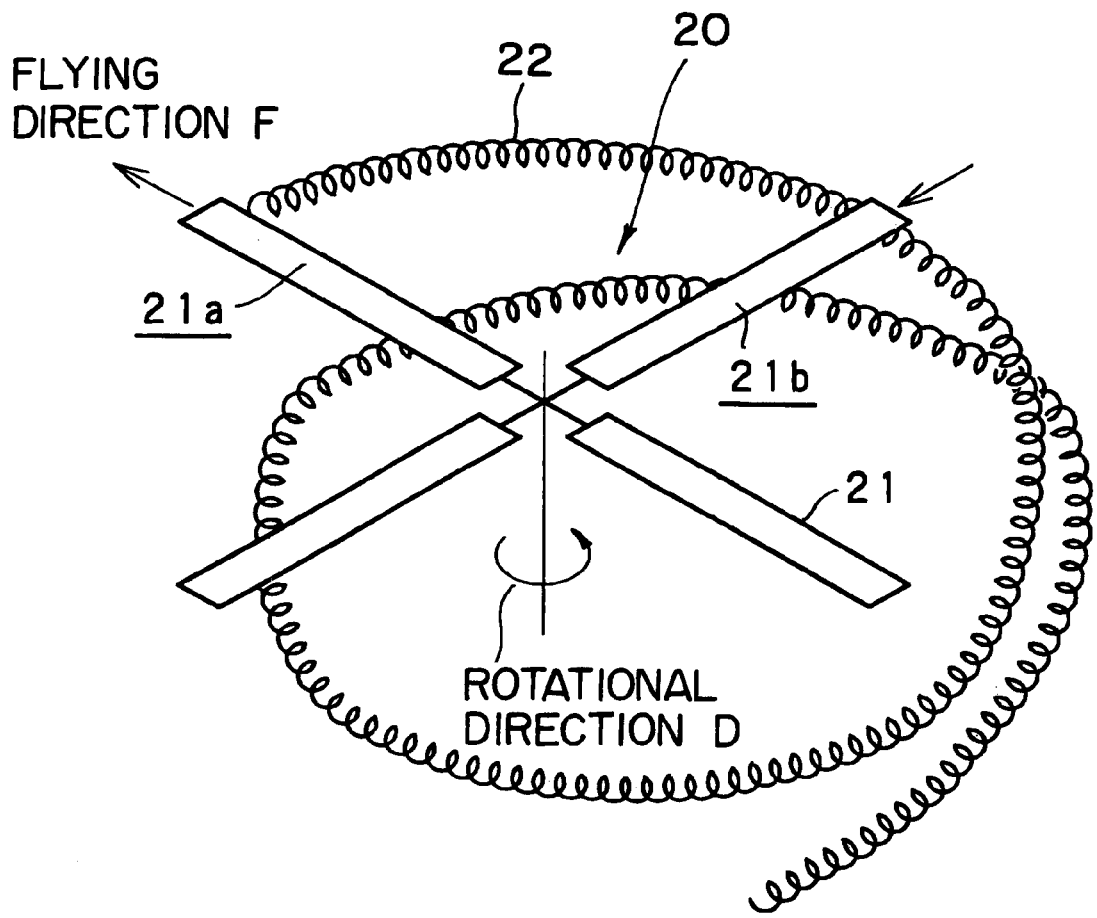
FIG. 16 is a pictorial view for assistance in explaining a principle of generation of BVI noise by the interaction of a succeeding rotor blade with tip vortices generated by the tip of a preceding rotor blade.
Figure 17:
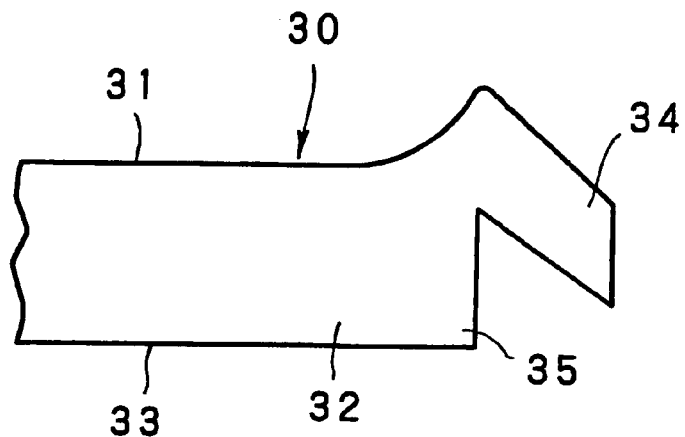
FIG. 17 is a plan view of an end part of a conventional rotor blade for a rotary-wing aircraft.
Figure 18:
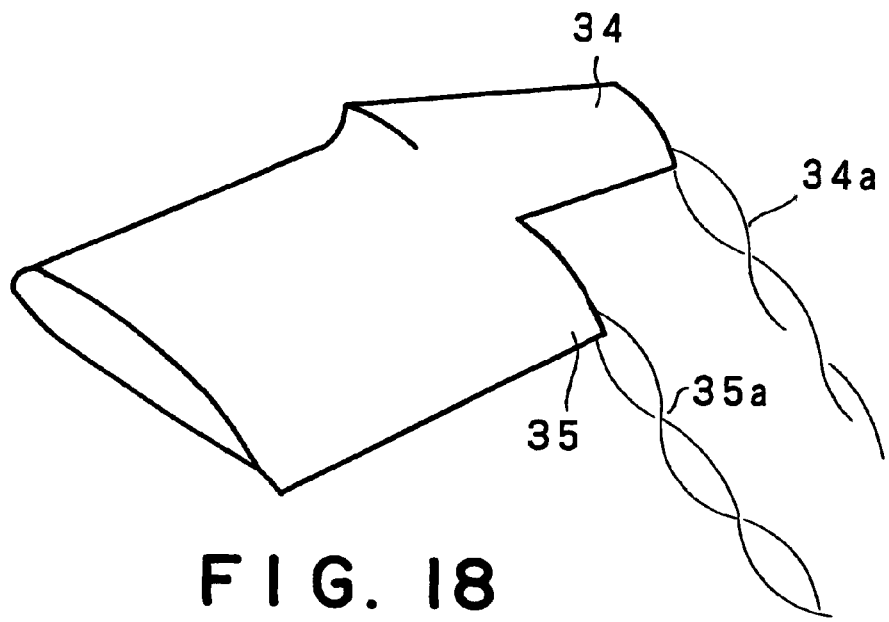
FIG. 18 is a perspective view of an end part of the conventional rotor blade of FIG. 17 for assistance in explaining the BVI noise suppressing effect of an end part of the rotor blade of FIG. 17.
Figure 19:
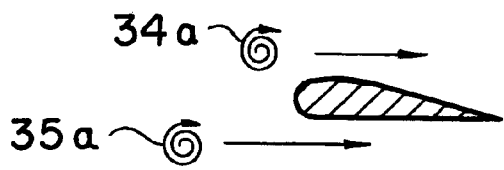
FIG. 19 is a view explanatory of the separation of two tip vortices.

FIG. 14 shows a modification of the rotor blade according to the present invention. This rotor blade has a main blade 2, a front tip blade 3 connected to the main blade 2 so that its blade incidence angle is variable, and a rear tip blade 4. As shown in FIG. 15, the front tip blade 3 is attached to a blade incidence angle control shaft 12. The blade incidence angle control shaft 12 is turned by an operating mechanism 13 including an electric motor or a hydraulic actuator to vary the blade incidence angle of the front tip blade 3 according to the azimuth of the rotor blade. When a rotary-wing aircraft provided with a rotary wing including rotor blades like this rotor blade is in a landing motion, the blade incidence angle of the front tip blade 3 relative to the main blade 2 is varied to make tip vortices generated by the front tip blade 3 and the rear tip blade 4 cancel each other efficiently.

The blade profile, the washout and the plane shape of the rotor blade affecting the downwash of the rotary wing are primary factors, and the forward flight speed and the angle of descent are secondary factors dominating an azimuth of the succeeding rotor blade at which the succeeding rotor blade interacts with tip vortices generated by the preceding rotor blade to generate BVI noise and a corresponding azimuth of the preceding rotor blade. The blade profile, the washout and the plane shape of the rotor blade are designed so that intensity of tip vortices can be most efficiently reduced, and the disposition, the plane shape, the incidence angle, the washout angle and the anhedral angle of the front tip blade and the rear tip blade are adjusted so that the intensity of tip vortices generated under various conditions determined by combinations of various forward flying speeds and various angles of descent can be reduced at a high efficiency on the average.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A rotor blade for a rotary-wing aircraft comprising:
a main blade having a substantially fixed chord length;
a front tip blade having a first chord length smaller than that of the main blade and connected to the main blade so that a front edge thereof is continuous with a front leading edge of the main blade; and
a rear tip blade having a second chord length greater than that of the front tip blade and connected to the main blade so that a trailing edge thereof is continuous with a trailing edge of the main blade.

2. The rotor blade according to claim 1, wherein:
the front tip blade and the rear tip blade have a difference in span length therebetween which is 40% or less of the substantially fixed chord length of the main blade.

3. The rotor blade according to claim 1, wherein:
at least one of the front tip blade and the rear tip blade is swept back at a sweepback angle ($\phi 1$, $\phi 2$) of 60° or below.

4. The rotor blade according to claim 1, wherein:
the front tip blade is tapered in a taper less than 0.7, and the rear tip blade is tapered in a taper less than 0.7.

5. The rotor blade according to claim 1, wherein:
at least one of the front tip blade and the rear tip blade is attached to the main blade at a blade incidence angle ($\phi 1$, $\phi 2$) in the range of −5° to +5°.

6. The rotor blade according to claim 1, wherein:
at least one of the front tip blade and the rear tip blade is twisted with respect to a direction along the length so as to form a washout angle in the range of −5° to +5°.

7. The rotor blade according to claim 1, wherein:
the rear tip blade is declined outward at an anhedral angle ($\eta$) of 10° or below.

8. The rotor blade according to claim 1, wherein:
a 25%-chord line of the front tip blade is on the front side of a 25%-chord line of the main blade having a substantially fixed chord at the joint of the front tip blade and the main blade.

9. The rotor blade according to claim 1, wherein:
a a part of said front leading edge of the main blade near the joint portion of the front tip blade and the main blade is formed in a forward convex curve.

10. The rotor blade according to claim 1, wherein:
the front tip blade is connected to the main blade so as to be able to turn about an axis extending in a direction of a span, and driving means is provided to pitch the front tip blade about the axis.

* * * * *